Patented Mar. 16, 1937

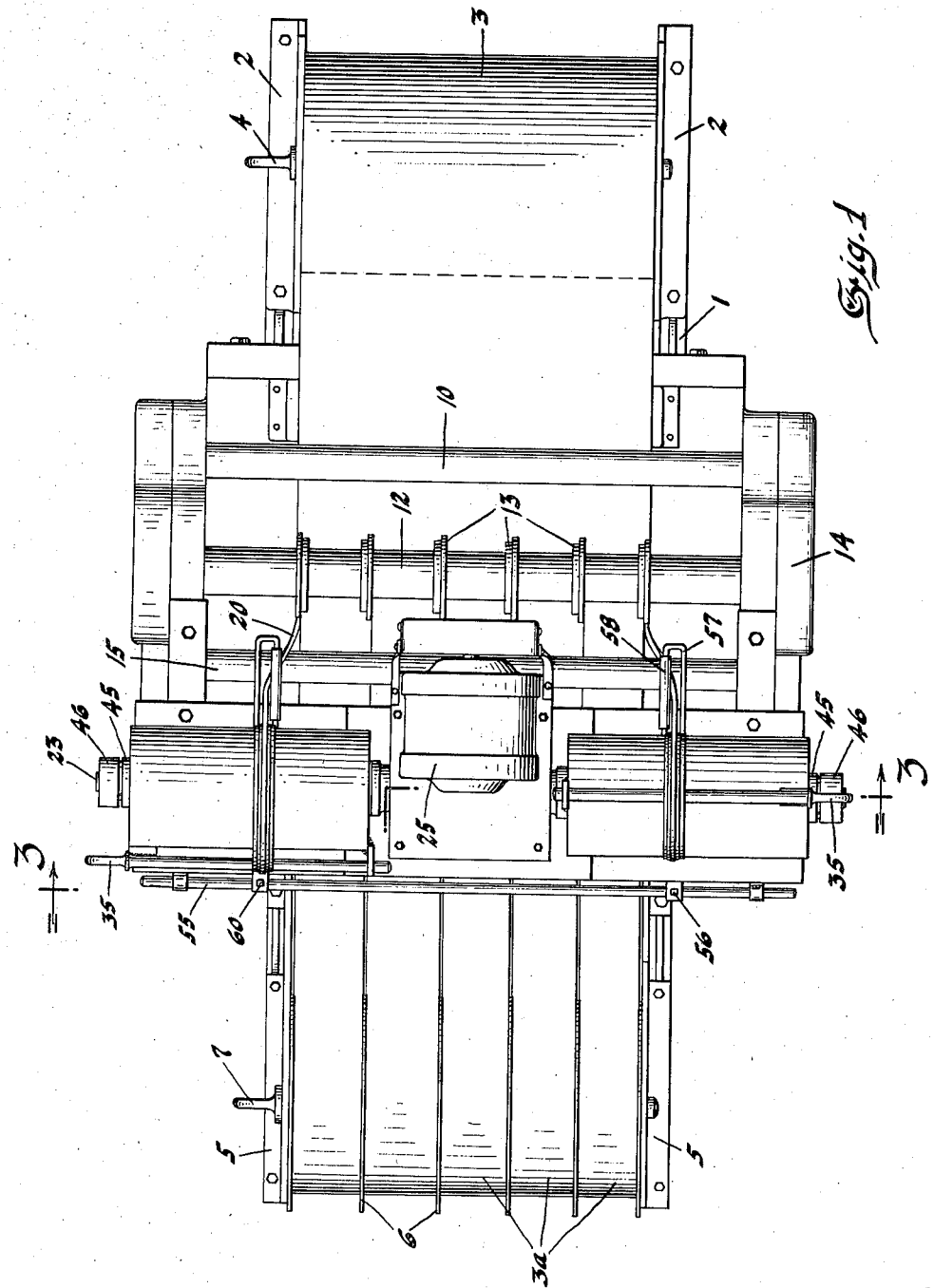

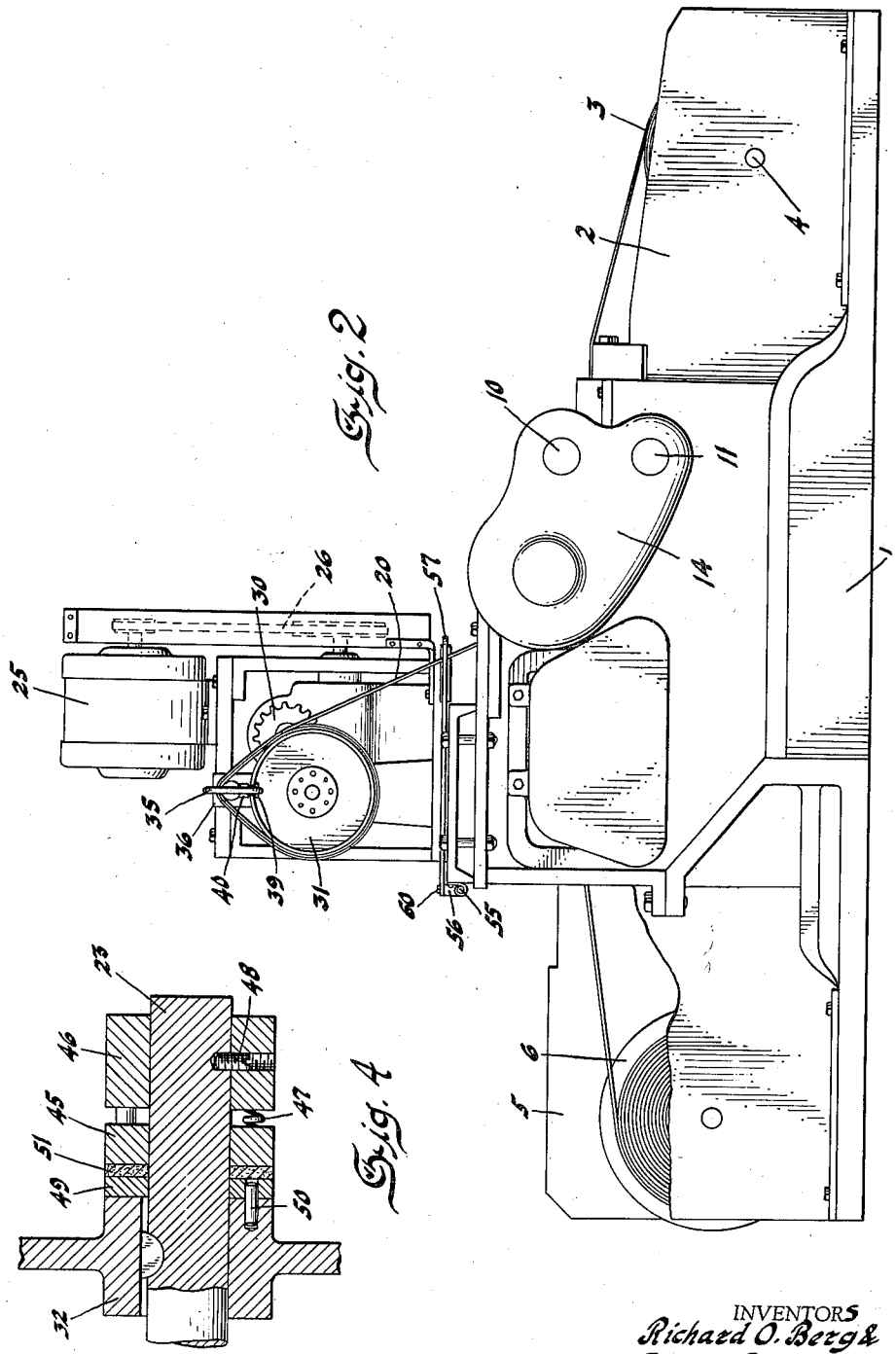

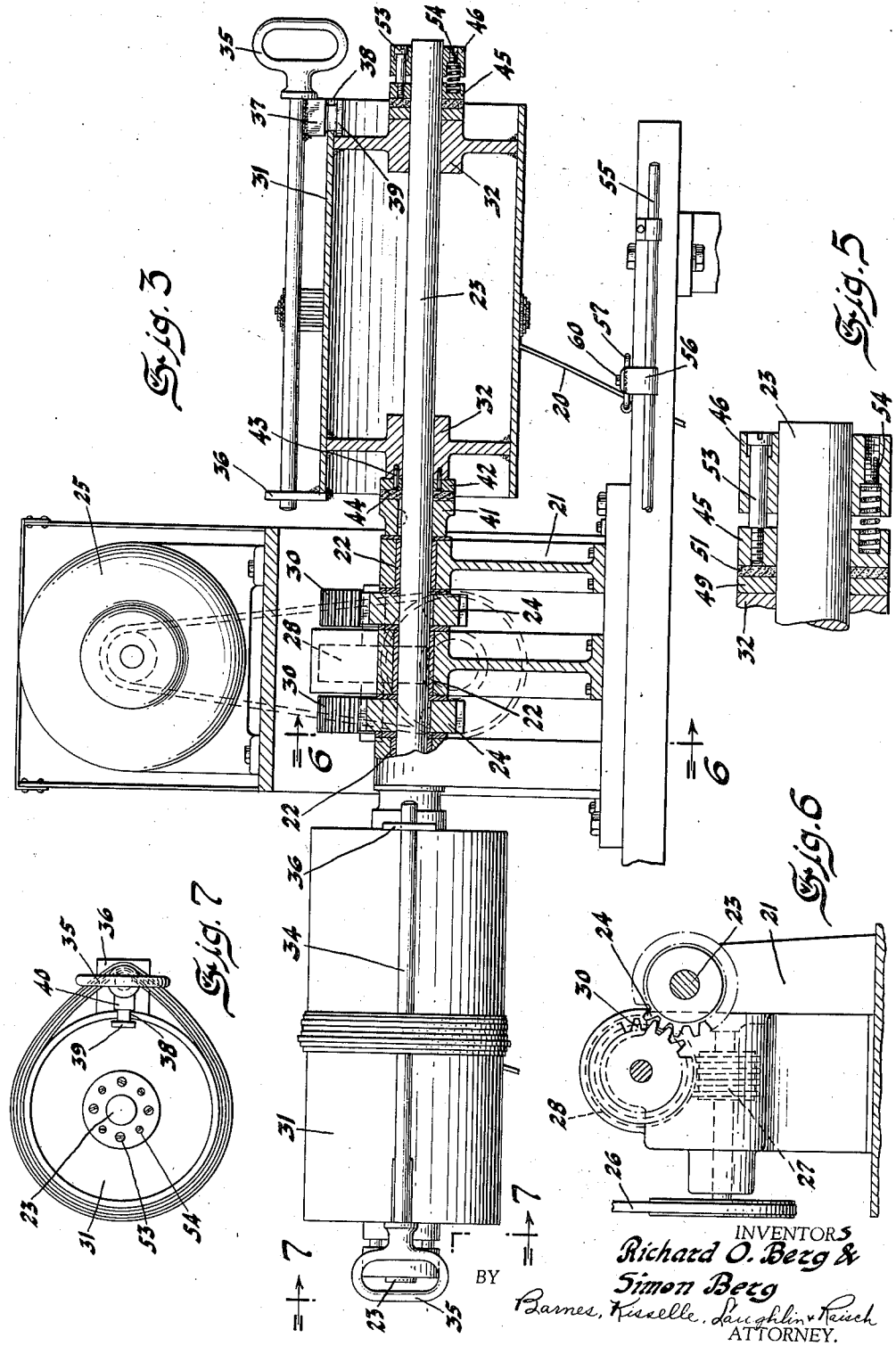

2,073,776

UNITED STATES PATENT OFFICE 2,073,776

SHEET STOCK CUTTING MACHINE

Richard O. Berg and Simon Berg, Detroit, Mich., assignors to Michigan Steel Tube Products Company, Detroit, Mich., a corporation of Michigan Application May 13, 1936, Serial No. 79,566

12 Claims. (Cl. 164—65)

This invention has to do with a machine for cutting sheet metal stock into strips.

The sheet stock from which welded tubing is made is advantageously supplied in the form of relatively wide sheets, and the sheet is then cut into strips of appropriate length to be formed into tubing. The particular tubing referred to is that tube where the edges of the strip stock are brought together in abutting relationship and welded, especially by the electrical resistance method. Of course, the apparatus of this invention may be used for forming strip stock from sheets, regardless of what the strip is to be used for; but in order to lay a foundation so that the complete environment may be understood, the so-called welded tube has been referred to.

Now the edges of the relatively wide sheet metal stock may not be of the desired smoothness or cut with the necessary precision. The sheet stock may be supplied on a reel and the edges may become roughened or rendered defective in handling. Therefore, it is preferable, when such a sheet is cut into strips, to sever a small piece from the edges of the sheet to thus remove any defective portions. It will be seen that this is desirable in the making of butt welded tube, to the end that the edges of all the strips formed from a sheet are in proper condition.

A problem arises, however, in disposing of and handling the narrow ribbon-like strip or shaving which is trimmed from the edges of the sheet. This is waste material, and due to the small cross dimensions, unless it is properly handled, it may weave around into different positions and get into the machine. Even though it may not get into the machine it may be more or less loosely disposed on the floor and piled up in an unwieldly, unshapely mass and difficult to handle. It is an object of this invention, therefore, to provide a machine wherein the edges of the sheet are trimmed and the trimmed waste material is wound into compact form, but in such a manner that a multiplicity of such windings may be easily and quickly removed as an entire mass. To this end a winding structure is provided in the manner of a spool or drum and which incorporates a removable part which, in effect, upon removal, decreases the circumference of the device upon which the windings are formed, so that a multiplicity of such windings may be quickly moved axially from the winding structure.

In the accompanying drawings:

Fig. 1 is a top plan view of a machine constructed in accordance with the invention.

Fig. 2 is a side elevational view thereof.

Fig. 3 is an enlarged view partly in section taken substantially on section line 3—3 of Fig. 1.

Fig. 4 is an enlarged cross sectional view of a clutch structure.

Fig. 5 is an enlarged cross sectional view of a clutch structure.

Fig. 6 is a detail view showing some of the operating mechanism, looking substantially on section line 6—6 of Fig. 3.

Fig. 7 is a composite view partly in section corresponding to section line 7—7 of Fig. 3.

The machine may comprise a base 1 having spaced side portions 2 at one end for receiving a roll of sheet metal stock 3. The roll may be located and then an axis rod 4 may be passed therethrough. The opposite end of the machine may have similar opposite side parts 5 designed to receive a removable axis rod 7. The sheet stock is fed from the roll 3, cut into strips and wound into coils on the rod 7. Dividing discs 6 may be used for dividing the coils. Suitable driving means (not shown) may be used for propelling the strip stock. The structure thus far described, however, has been heretofore employed.

During the travel of the sheet of stock from the roll to the spools it is suitably guided over rollers and cut into strips. For example, there is a guide roll 10 lying over the strip and another guide roll underneath the same located on the axis 11 (Fig. 2). A cutting roll 12 having spaced cutting knives 13 overlies the strip and this may function in cooperation with cutting rolls underneath the strip. These guide and cutting rolls may be power driven by suitable gears enclosed in housings 14. The cutting knives likewise have been heretofore used so that no further detail as to their construction and function is needed herein. It will be noted that the sheet 3 is cut into a plurality of strips 3a, and suitable guide rolls or the like may be provided for the strips on their way to the coils, and one such roll is illustrated at 15.

As heretofore pointed out, the edges of the sheet 3 may not be cut to the proper precision required or may have been damaged in the handling of the roll, and therefore the edges are trimmed by the outermost cutter elements 13, the trimmed ribbon or shaving being illustrated at 20.

Mounted on the framework of the cutting machine is a frame structure generally illustrated at 21 provided with suitable bearings 22 in which a shaft 23 is journaled. The shaft is driven, for which purpose there may be one or more gears 24 keyed thereto, and these may be located between spaced outer bearings and an intermediate bearing for the shaft. A driving motor 25 is mounted on top of the frame 20 and its power may be transmitted through a belt 26 and a suitable pulley wheel to a worm 27 (Fig. 6). This worm drives a worm gear 28 mounted on a countershaft 29, which in turn carries gears 30, the teeth of which mesh with the gears 24.

Since both edges of the sheet are trimmed, a suitable winding structure is mounted on each end of the shaft 23. This winding structure may take the form of a drum or spool 31 having hub portions 32 rotatably mounted on the shaft 23. Fixed to each drum so as to rotate therewith is a rod 34 having a handle 35 at one end. One end of the rod may extend through a bracket 36 secured to one end of the drum. A holding piece 37 is secured to the rod adjacent the handle, and the drum is slotted as at 38 to receive this holding piece. This piece 37 has a head 39 which lies inside the drum and a portion 40 which lies outside the drum with an intermediate portion of reduced cross dimensions to slidably fit into the slot.

Suitable clutch means, preferably capable of slipping, is utilized for driving the winding means. One advantageous form of clutch structure for each winding means is as follows: There is a driving member 41 keyed to the shaft and a driven member 42 of suitable material fastened to one of the hub portions of the drum, as for example, by dowel pins 43. Between these driving and driven members is a disc of friction material 44. At the opposite end of the drum is a driving member 45 backed up by a collar 46, through the means of springs 47. The collar 46 is fixed to the shaft as by means of a set screw 48. A driven plate 49 may be fixed to one hub of the drum as by means of dowel pins 50 and between the plates 45 and 49 is a friction disc 41. Driving pins 53 may be taken through the collar 46 and screw threaded into the driving member 45. The heads of these pins may be located in countersunk portions in the collar 46 and serve to limit the extension of the springs so that the collar 46 and member 45 may be removed or applied to the shaft as a unit. The pins 53 serve to drive the member 45. The tension of the springs 47 may be adjusted by means of an adjusting screw 54, one for each spring, as shown in Fig. 5. The springs and driving pins are preferably spaced alternately as illustrated in Fig. 7.

A suitable guide means is preferably provided for guiding the scrap edges to each winding head. For this purpose there may be a supporting bar 55 upon which is slidably mounted a block 56 which carries an elongated loop 57, and which extends under the drum, as shown in Fig. 2. One portion of the loop may have a rotating sleeve or collar thereon as at 58. There is one such guide device for each winding head. The blocks 56 may be set into position by set screws 60 which may take against the rod 55.

The operation is as follows: As the sheet material moves from the drum 3 to the coils it is cut into strips, and the edges of the sheet are trimmed forming the scrap 20. At the beginning of the operation the operator feeds the scrap 20 through the loop 57, and the first convolution of the strip on the winding head may be aided by hand operation. That is to say, the operator may aid the scrap edge in the initial convolution or the scrap may be wound in more or less of a hitch around the rod 34. However, after one or two convolutions are made, the strip being of quite stiff metal stock, will grip the drum and the winding will continue. It will be noted that the scrap edge is wound not only around the drum but is wound around the rod 34 which moves bodily with the drum, the wound stock taking a shape somewhat as illustrated in Fig. 7. Now the winding drums need not necessarily be timed exactly with the movement of the cutting machine, but may tend to run a little in advance of the same so that there is a tension on the severed edges 20. For this purpose the friction clutch structure may slip and the clutch pressure may be adjusted through the adjusting screws 54 so that the amount of tension may be determined as desired. The guide members comprising the loops 57 are not necessarily of a shuttle nature to provide an even winding. The machine is attended by an operator, and when the winding piles up in one location the operator may merely shift the loop to another location. If necessary the guides may be set by means of the set screws 60. Ordinarily, the winding heads have a sufficient capacity to hold all of the trimmed edge portions from a single roll of sheet stock so that, when the roll 3 is exhausted, and a new one is placed in the machine, the waste stock wound on the drums may be removed.

This is done as follows: The operator grasps the handle 35 and pulls the rod 34 out of position. It will be understood that the holding piece 37 comes out with the rod. The stock is now loose on the drum, although wound into a compact, easily handled mass and can be easily slipped off the drum. The rods are now inserted before the machine is again set into operation with a new roll of sheet stock.

We claim:

1. In a machine for cutting sheet metal stock into strips and having cutting instruments past which the stock moves for cutting the stock into strips and including cutting instruments for trimming the edges of the sheet; means for winding the trimmed waste edge comprising, a winding member, means for rotating the same, a member on the winding member movable bodily therewith and located radially outside of the winding surface whereby the waste edge is wound around both members with the said two members defining the circumferential extent of the inner windings, and means removably mounting said member on the winding member so that the same may be removed while the windings are in place to loosen the windings, whereby the same may be removed bodily from the winding member.

2. In a machine for cutting sheet metal stock into strips and having cutting instruments past which the stock moves for cutting the stock into strips and including cutting instruments for trimming the edges of the sheet; means for winding the trimmed waste edge comprising, a winding member, means for rotating the same, another member on the winding member movable bodily therewith and positioned outside the external peripheral extent of the winding surface of the winding member whereby the waste edge is wound around both members, and the said both members defining the circumferential extent of the inner windings, means removably mounting said second member on the winding member so that the same may be removed in an axial direction to thereby loosen the support for the windings, whereby the windings of the waste edge may be removed bodily from the winding member in an axial direction.

3. In a machine for cutting sheet metal stock into strips and having cutting instruments past which the stock moves for cutting the stock into strips and including cutting instruments for trimming the edges of the sheet; a winding drum, means for rotating the same, a member mounted on the drum for movement bodily therewith and positioned outwardly of the peripheral form of the drum, said member being removable by axial movement relative to the drum, whereby the waste edge is wound around the drum and member, with the drum and member defining the circumferential extent of the inner windings which is greater than the circumferential extent of the winding member and whereby the inner windings become loose on the drum upon removal of said member so that the same may be removed from the drum.

4. In a machine for cutting sheet metal stock into strips and having cutting instruments past which the stock moves for cutting the stock into strips and including cutting instruments for trimming the edges of the sheet; a winding drum, means for rotating the same, a rod-like member, means for mounting the same removably on the outside of the drum whereby the rod may be removed by axial movement, the drum and rod-like member defining the circumferential extent of the inner windings of the waste edge which is greater than the circumferential extent of the winding member, and serving upon removal of the rod-like member by axial movement, to loosen said windings, whereby the mass of windings may be removed bodily from the drum in an axial direction.

5. In a machine for cutting sheet metal stock into strips and having cutting instruments past which the stock moves for cutting the stock into strips and including cutting instruments for trimming the edges of the sheet; a winding drum, means for rotating the same, a bracket projecting outwardly from one edge of the drum, a rod-like member removably secured in said bracket, another bracket on the rod-like member and removably engaging the opposite side of the drum, said rod-like member increasing the circumferential extent of the inner windings over what said extent would be if wound only on the drum, said rod-like member and the bracket attached thereto being removable from underneath the windings whereby the windings are loosened upon the drum so that the same may be removed bodily in an axial direction from the drum.

6. In a machine for cutting sheet metal stock into strips and having cutting instruments past which the stock moves for cutting the stock into strips and including cutting instruments for trimming the edges of the sheet; a winding drum, means for rotating the same, an apertured bracket projecting outwardly from the drum at one edge, a rod member adapted to have one end positioned in the bracket, means on the opposite end of the rod for engaging the drum, whereby the rod is held removably attached to the drum and extending in an axial direction across the drum, said drum and rod serving to define the circumferential extent of the inner windings, said rod and said means being detachable from the drum and from underneath the windings by movement in an axial direction whereby the windings thereon become loose on the drum and may be removed from the drum axially.

7. In a machine for cutting sheet metal stock into strips and having cutting instruments past which the stock moves for cutting the stock into strips and including cutting instruments for trimming the edges of the sheet; a winding drum, means for rotating the same, a member removably attached to the drum and being removable by axial movement and serving to enlarge the circumferential extent of the inner windings, guide means adjustable lengthwise of the drum for guiding the waste edge onto the drum, said member, upon being removed by axial movement, serving to free the inner windings of the waste edge so that the windings are loose on the drum whereby the windings may be removed bodily by axial movement off the drum.

8. In a machine for cutting sheet metal stock into strips having cutting instruments past which the stock moves with a substantially predetermined speed for cutting the stock into strips and including cutting instruments for trimming the edges of the sheet; means for winding the trimmed waste edge comprising, a winding member, driving means for rotating the same, and friction clutch means disposed between the driving means and the winding member and arranged to slip whereby the driving means may tend to rotate the winding means at a speed faster than that of the speed of movement of the sheet stock, whereby the waste edge is tensioned and wound relatively tightly on the winding member, said friction clutches slipping to provide for a substantially synchronized movement as between the winding means and the movement of the stock.

9. In a machine for cutting sheet metal stock into strips and having cutting instruments past which the stock moves for cutting the stock into strips and including cutting instruments for trimming the edges of the sheet; a shaft mounted so that it is substantially perpendicular to the direction of movement of the sheet stock, bearings for the central portion of the shaft with opposite ends projecting therefrom, winding means on opposite ends of the shaft upon which the opposite waste edges are wound, driving means operatively coupled to the central portion of the shaft for rotating the same, and clutch means between the shaft and each winding member.

10. In a machine for cutting sheet metal stock into strips and having cutting instruments past which the stock moves for cutting the stock into strips and including cutting instruments for trimming the edges of the sheet; a shaft mounted so that it is substantially perpendicular to the direction of movement of the sheet stock, bearings for the central portion of the shaft with opposite ends projecting therefrom, winding means on opposite ends of the shaft upon which the opposite waste edges are wound, driving means operatively coupled to the central portion of the shaft for rotating the same, and friction clutch means between the shaft and each winding means, so that the driving means may tend to rotate the winding means at a speed faster than the movement of the strip stock, whereby the waste edges are wound under tension on the winding means with the friction clutches slipping so that the winding means and the movement of the sheet stock is substantially synchronized.

11. In a machine for cutting sheet metal stock into strips and having cutting instruments past which the stock moves for cutting the stock into strips and including cutting instruments for trimming the edges of the sheet; a shaft mounted so that it is substantially perpendicular to the direction of movement of the sheet stock, bearings for the central portion of the shaft with opposite ends projecting therefrom, winding means on opposite ends of the shaft upon which the opposite waste edges are wound, driving means operatively coupled to the central portion of the shaft for rotating the same, and friction clutch means between the shaft and each winding means, whereby the driving means may tend to rotate the winding means at a speed faster than the movement of the strip stock so that the waste edges are wound under tension on the winding means, and with the friction clutches slipping so that the winding means and the movement of the sheet stock is substantially synchronized, and adjustable spring means for providing packing engagement of the friction clutch means.

12. In a machine for trimming at least one edge from sheet stock having cutting instruments for cutting at least one edge of the stock and past which the stock moves; a winding member, means for rotating the same, a device detachably secured to the winding member and positioned so as to increase the peripheral extent of the winding member and removable therefrom by movement in an axial direction, the waste edge being wound around the winding member and said device with the winding member and device defining the circumferential extent of the inner windings, said device, upon being removed and pulled out from underneath the windings by axial movement, loosening the windings upon the winding member whereby the windings of the waste edge may be removed as a body axially off the winding member.

RICHARD O. BERG.
SIMON BERG.